United States Patent Office.

RICHARD L. ETHERIDGE, OF QUITMAN, MISSISSIPPI, ASSIGNOR OF ONE-HALF TO THOMAS W. HAND.

MANUFACTURE OF ROSIN.

SPECIFICATION forming part of Letters Patent No. 508,608, dated November 14, 1893.

Application filed August 29, 1893. Serial No. 484,270. (No specimens.)

*To all whom it may concern:*

Be it known that I, RICHARD L. ETHERIDGE, a citizen of the United States, residing at Quitman, in the county of Clarke and State of Mississippi, have invented certain new and useful Improvements in the Manufacture of Rosin, of which the following is a specification.

This invention relates to an improvement in the manufacture of "rosin" and the product resulting therefrom, hereinafter described and definitely pointed out in the claims.

It is well known that the highest grades of rosin are produced from the first year collections of the crude turpentine or what is commonly known as "virgin dip." This grade however varies or decreases as the season advances the finest grades being produced from the dippings made from April 1 to August 1. The second year's collection is a much lower grade and usually termed "yearling dip" while the third year's collection is of a still lower grade.

Heretofore the manufacturers have experienced much trouble by the producers mixing the "virgin" and "yearling" dips, small amounts of the latter coloring the former and resulting in the production of a lower grade of rosin.

The object of the present invention is to so treat the collections or "dips" that the grade of "virgin dip" may be kept up during the entire season, and the grade of the "yearling dip" be greatly improved and to almost if not quite eradicate the coloring matter imparted to the rosin by the mixing of the "virgin" and the "yearling" dips.

To this end the invention consists in incorporating into the crude turpentine a quantity of "bluing" preferably indigo commonly known as "washing bluing."

In treating the "virgin" dip collected during the earlier part of the season I incorporate from one quarter to three-quarters of an ounce of bluing in two hundred and eighty pounds of the dip and then distill the mixture in the usual way.

In treating the "yearling" dip I incorporate from three-quarters to an ounce of bluing in about two hundred and eighty pounds of the dip and distill.

In treating the mixture of "virgin" and "yearling" dips I incorporate three-quarters of an ounce of bluing into about seventy pounds of "yearling" and two hundred and ten pounds of the "virgin" dip, and distill the mixture. By this means the coloring imparted to the "virgin" by the "yearling" dip is entirely eradicated and the grade greatly improved. It will therefore be seen that the spirit of the invention is the incorporating of bluing into the crude turpentine and it is to be understood that the quantity and proportion may be varied when desired. I believe that I am the first to introduce bluing into the rosin producing product.

Having thus described my invention, what I claim as new, and desire to secure by Letters Patent, is—

1. The process of manufacturing rosin consisting in incorporating into the rosin producing turpentine a quantity of bluing and finally distilling the mixture, substantially as described.

2. The process of manufacturing rosin consisting in mixing different grades of the rosin producing turpentine adding a quantity of bluing thereto and finally distilling the mixture, substantially as described.

3. A rosin product consisting of a distilled quantity of crude turpentine and bluing, substantially as described.

In testimony whereof I affix my signature in presence of two witnesses.

RICHARD L. ETHERIDGE.

Witnesses:
 G. I. WAINWRIGHT,
 T. W. HAND.